(12) United States Patent
Gaucher et al.

(10) Patent No.: US 10,836,361 B2
(45) Date of Patent: Nov. 17, 2020

(54) ADAPTER FOR WIPING SYSTEM

(71) Applicant: Valeo Systèmes d'Essuyage, Le Mesnil Saint Denis (FR)

(72) Inventors: Vincent Gaucher, Issoire (FR); Stéphane Houssat, Issoire (FR); Guillaume Mouleyre, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 92 days.

(21) Appl. No.: 15/964,291

(22) Filed: Apr. 27, 2018

(65) Prior Publication Data
US 2018/0312140 A1   Nov. 1, 2018

(30) Foreign Application Priority Data

Apr. 28, 2017 (FR) ...................... 17 53797

(51) Int. Cl.
*B60S 1/40* (2006.01)
*B60S 1/38* (2006.01)

(52) U.S. Cl.
CPC ........... B60S 1/4048 (2013.01); B60S 1/3858 (2013.01); *B60S 2001/4051* (2013.01); *B60S 2001/4054* (2013.01)

(58) Field of Classification Search
CPC .... B60S 1/4048; B60S 1/4045; B60S 1/4016; B60S 1/4019; B60S 2001/4051; B60S 2001/4054; B60S 2001/4022; B60S 1/40; B60S 1/4038
USPC ...................................... 15/250.32
See application file for complete search history.

(56) References Cited

U.S. PATENT DOCUMENTS

| 5,168,597 | A | 12/1992 | Schon et al. | |
| 8,479,349 | B2* | 7/2013 | Boland | B60S 1/3848 |
| | | | | 15/250.32 |
| 9,845,076 | B2* | 12/2017 | Caillot | B60S 1/3868 |
| 2013/0239356 | A1 | 9/2013 | Yoshimoto et al. | |
| 2015/0151718 | A1* | 6/2015 | Moll | B60S 1/4048 |
| | | | | 15/250.32 |

FOREIGN PATENT DOCUMENTS

DE   10130903 A1 *  5/2002
DE   102011053090 A9 *  5/2013
(Continued)

OTHER PUBLICATIONS

Machine translation of description portion of WO publication 2005/039944, published May 2005 (Year: 2005).*

(Continued)

*Primary Examiner* — Gary K. Graham
(74) *Attorney, Agent, or Firm* — Osha Bergman Watanabe & Burton LLP (57) ABSTRACT

The invention relates to an adapter (13) designed to connect a wiper blade (1) to a drive arm (2) of a windscreen wiping system (3) for vehicles, the adapter (13) being outfitted with at least one locking means (18) designed to lock the adapter (13) in a terminal portion (11) of the drive arm (2), the adapter (13) comprising a pivoting means (27) of the locking means (18), characterized in that the adapter (13) comprises a portion (40) at least partially bounding off a volume (26) of the adapter (13), the locking means (18) comprising at least one appendage (39) which extends into the inside of the volume (26).

9 Claims, 7 Drawing Sheets

(56) References Cited

FOREIGN PATENT DOCUMENTS

| | | | |
|---|---|---|---|
| DE | 2014114688 A1 * | 4/2016 | |
| EP | 3112227 A1 | 1/2017 | |
| FR | 2782043 A1 | 2/2000 | |
| FR | 3040946 A1 | 3/2017 | |
| WO | WO2005/039944 A1 * | 5/2005 | |
| WO | 2016000778 A1 | 1/2016 | |

OTHER PUBLICATIONS

Machine translation of description portion of German publication 102011053090, published May 2013 (Year: 2013).*
Machine translation of description portion of German publication 10130903, published May 2002. (Year: 2002).*
Preliminary Report with Opinion Issued in Corresponding French Application No. 1753797, dated Dec. 18, 2017 (7 Pages).

* cited by examiner

ADAPTER FOR WIPING SYSTEM

The present invention relates to windscreen wiping systems for automobiles. Its subject matter is an adapter which is comprised in such a windscreen wiping system.

A windscreen wiping system, commonly called windscreen wipers, for an automobile is designed to remove, by wiping, the liquids and grime which might disturb the view of a driver of the automobile of his or her surroundings. These windscreen wipers generally comprise a drive arm which performs an angular back and forth movement about an axis of rotation, and an elongated wiper blade outfitted with a scraper blade made of elastic material. By rubbing against a glass surface, front or rear, of the automobile, the scraper blade wipes off the water and a certain amount of dirt and grime and removes it from the field of vision of the driver.

Regardless of the configuration of the wiper blade, that is, whether it is a wiper blade comprising hinged calipers which hold the scraper blade in several distinct zones, or a wiper blade having at least one flexible support which holds the scraper blade along its entire length, also known as a "flat blade", the wiper blade is attached to a terminal portion of the drive arm by means of a connection device comprising a mounted connector which is integrated with the wiper blade.

At each of the longitudinal ends of the wiper blade in its "flat blade" variant, the scraper blade and the flexible support are outfitted with an end cap which participates in holding together the scraper blade and the flexible support.

The prior art includes the document US2013/0239356A1 which describes a fixation device comprising the connector carrying the wiper blade, and an adapter joining the connector to the terminal portion of the drive arm.

A general problem arising in the field is a need to provide a robust connection device. In fact, because of the angular back and forth movement given to the drive arm, the wiper blade undergoes a centrifugal force which generates major stresses on the elements making up the wiper blade. In particular, the adapter is subjected to stresses which are applied to a locking means comprising the adapter. In event of breakage of the locking means, the wiper blade is liable to become loose from the drive arm, which is harmful if not dangerous.

One purpose of the present invention is to propose an adapter which is designed to prevent the uncoupling of the drive arm and the wiper blade.

Another purpose of the present invention is to propose a connection device which is designed to resist a major longitudinal stress exerted on the connection device, especially on the adapter.

An adapter of the present invention is an adapter designed to connect a wiper blade to a drive arm of a windscreen wiping system for vehicles, the adapter being outfitted with at least one locking means designed to lock the adapter in a terminal portion of the drive arm, the adapter comprising a pivoting means of the locking means, distinguished in that the adapter comprises a portion at least partially bounding off a volume of the adapter, the locking means comprising at least one appendage which extends into the inside of the volume.

The adapter advantageously comprises any one of at least the following characteristics, taken alone or in combination:

the locking means comprises a plate at the end of which is arranged a locking pin designed to fit into a slot of the terminal portion, the appendage emerging from the locking pin, the pin emerges from the plate and has a substantially rectangular or square horizontal section, the pivoting means may be formed, for example, by the plate, which then becomes a flexible tab, alternatively or additionally, the pivoting means may be formed by a hinge, placed at the intersection between the plate and an intermediate portion of the adapter, according to one aspect of the invention, the locking pin comprises a front wall, a rear wall and two side walls joining the front wall to the rear wall, the appendage prolonging the rear wall into the volume. Front and rear run along a principal direction of extension of the adapter, known as the longitudinal direction of the adapter, the locking pin comprises a transverse flange, or nose, which emerges from the front wall, the plate and the transverse flange bounding off a zone designed to receive an edge bounding off the slot. Thus, the transverse edge and the plate of the locking means grasp in sandwich fashion a thickness of the wall making up the terminal portion of the drive arm, the adapter may comprise an intermediate portion interposed between a front portion and a rear portion along a longitudinal axis of the adapter, the rear portion comprising the locking pin and the portion, the volume extends along a height and the appendage is integrally contained inside the volume, the portion is a peripheral belt surrounding the locking means. It is understood here that the belt in particular surrounds the locking pin at least in a plane parallel, or substantially parallel, to a plane in which most of the plate is inscribed, the peripheral belt comprises a transverse wall supported by two longitudinal walls which bound off the volume, the longitudinal walls emerging from the intermediate portion. The volume is likewise bounded off by the intermediate portion of the adapter, the transverse wall is designed to form an abutment for the appendage in event of breaking of the locking means or the pivoting means, for example, the plate or the hinge.

The adapter of the present invention is particularly appropriate for an after-sale market of the wiper blade.

The present invention proposes an adapter which is designed to provide a supporting function for the wiper blade on the terminal portion of the drive arm, including when longitudinal stresses result in breaking of the locking means, and especially the locking pin of this means. More generally, the present invention proposes an adapter which effectively secures the mechanical link between the terminal portion of the drive arm and the connector outfitting the wiper blade. These purposes are achieved by the adapter described in the present document.

The present invention also relates to a connection device formed by a connector such and an adapter, arranged in the same container, separated from one another or assembled together.

The present invention also relates to a wiper blade comprising a wiper strip and a flexible support which holds the scraper blade along its length, and at least one adapter as proposed in the present document or a connection device as presented above, the wiper blade being outfitted with such a connection device. The subject matter involves, for example, a container which receives the flat wiper blade and an adapter as detailed in the document, separate from or assembled on the wiper blade, and intended for the after-sale automobile market, or aftermarket.

The present invention finally relates to a windscreen wiping system comprising a drive arm provided with a terminal portion, a connector integrated in a wiper blade and an adapter as described in the present document and joining the connector to the terminal portion of the drive arm.

Other characteristics, details and advantages of the invention will emerge more clearly from a reading of the following description, given as an example, in connection with the drawings, in which.

It should be noted first of all that the figures shows the invention in a detailed manner for the implementing of the invention, and of course these figures may serve to better define the invention, if necessary.

Figure 1:
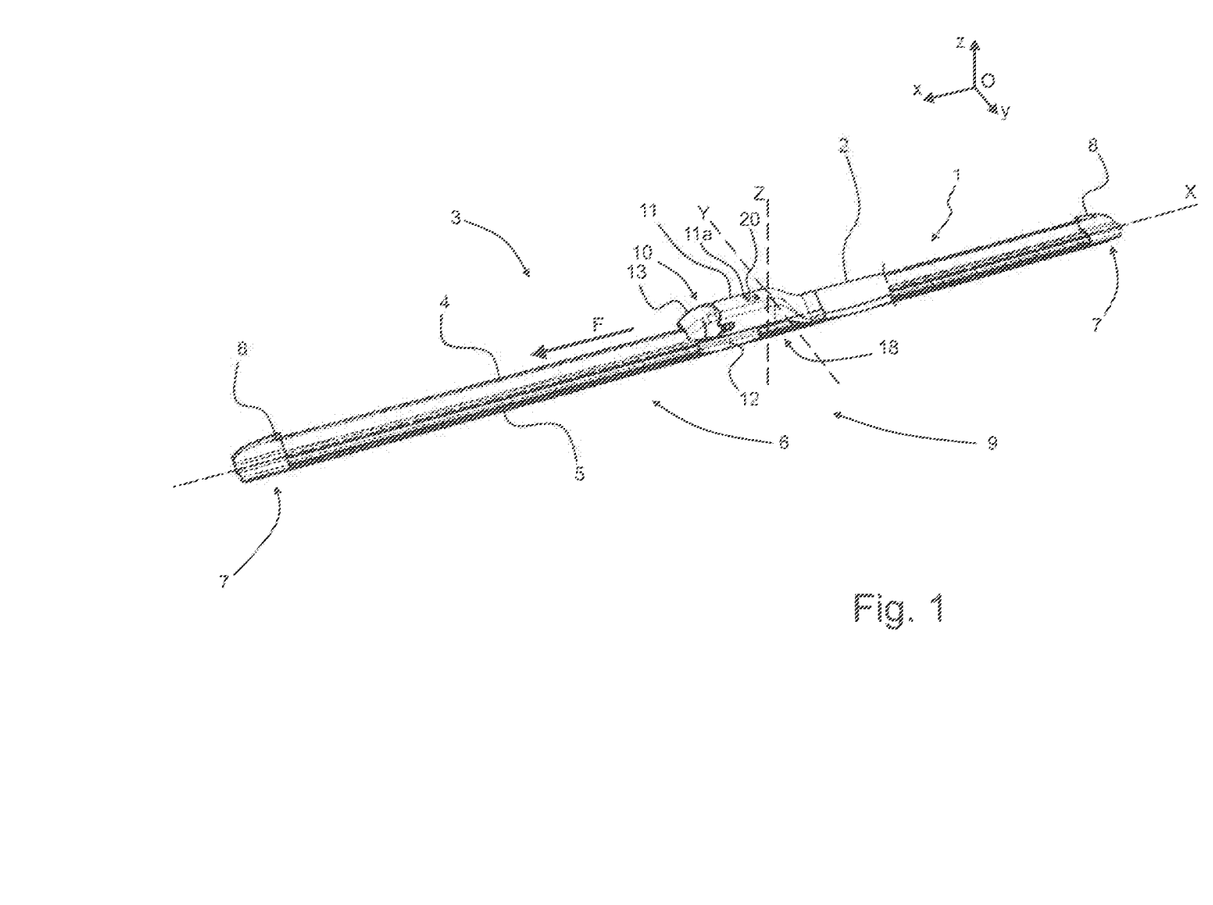
FIG. 1 is a perspective view of a windscreen wiping system according to the present invention.

In the figures, the terms longitudinal, transverse, vertical, lateral, left, right, upper, lower, pertain to the orientation, in an orthonormalized reference system Oxyz, of a wiper blade 1 as illustrated in FIG. 1. In this reference system, the axis Ox represents the longitudinal direction, the axis Oy represents the transverse direction, and the axis Oz represents the vertical direction of the particular object, in particular the adapter or the wiper blade. In this reference system, a vertical longitudinal plane is parallel to the plane Oxz, a vertical transverse plane is parallel to the plane Oyz and a longitudinal horizontal plane is parallel to a plane Oxy.

In FIG. 1, a wiper blade 1 of the present invention extends along a longitudinal axis X, parallel to the axis Ox. The terms left and right refer to a position along a transverse axis Y, parallel to the axis Oy, on either side of the longitudinal axis X. A vertical axis Z symbolizes a vertical direction, parallel to that of the axis Oz, which is perpendicular to the above-described longitudinal and transverse directions. The terms upper or lower refer to orientations along the vertical axis Z, the term lower containing the windscreen plane. For the longitudinal directions, the terms outer or inner refer to a pivot point of the wiper blade 1 on a drive arm 2 of the wiper blade 1, the term inner corresponding to the portion where the drive arm 2 and a half-blade extend, the term outer corresponding to the portion where the other half-blade extends.

An automobile is commonly outfitted with a windscreen wiping system 3 to remove water and/or dirt and grime present on a glass surface, especially a rear window or a front windscreen of the automobile. The windscreen wiping system 3 comprises the drive arm 2 which is able to perform an angular back and forth movement along and on top of the glass surface being wiped.

The windscreen wiping system 3 also comprises the wiper blade 1, which extends along the longitudinal axis X. The wiper blade 1 comprises a scraper blade 5 and at least one air deflector 4. The air deflector 4 is designed to transform a pressure applied by a flow of air circulating along the glass surface into a force applying the wiper blade 1 against the glass surface of the automobile.

The scraper blade 5 is the part of the wiper blade 1 in direct contact direct with the glass surface to remove the water and/or dirt and grime present on the latter. The scraper blade 5 for example is a flexible strip made of elastic material, such as a polymer, or rubber in particular. The wiper blade 1 also comprises a flexible support 6 which allows the wiper blade 1 a certain deformation in the plane Oxz, so as to distribute the force of application of the drive arm 2 along the wiper blade 1 and thus follow a curvature of the glass surface.

The wiper blade 1 likewise comprises at each of its longitudinal ends 7 an end cap 8. Each end cap 8 is provided to hold the scraper blade 5 and the flexible support 6 together, one such end cap 8 being able for example to cover a terminal portion of the air deflector 4. The flexible support 6 thus extends from a first longitudinal end 7 of the wiper blade 1 to a second longitudinal end 7 of the same wiper.

According to the exemplary embodiment, the flexible support 6 is for example a metal band, or spine. Such a spine is advantageously a single piece, at least as seen in the plane Oxy.

At least the air defector 4, the scraper blade 5 and the flexible support 6 form a semi-rigid structure 9 which is carried by a connection device 10, interposed between a terminal portion 11 of the drive arm 2 and the semi-rigid structure 9. Such a connection device 10 comprises, for example, a connector 12 integrated at least in isostatic manner with the semi-rigid structure 9, and an adapter 13 joined by a pivot link to the connector 12.

The terminal portion 11 of the drive arm 2 has a U-shaped cross section, with an upper wall and two branches, the two branches of this U terminating straight. Thus, such a terminal portion does not have a folded edge which tends to form a C with the upper wall and with the particular branch.

The connection device 10 provides a mechanical link between the terminal portion 11 of the drive arm 2 and the wiper blade 1 and thus allows separating the wiper blade 1 from the drive arm 2, for example in order to replace the wiper blade 1. In general, the connection device 10 of the present invention preferably comprises two pieces in all, the connector 12 and the adapter 13.

To enable a coupling and uncoupling of the adapter 13 with respect to the terminal portion 11 of the drive arm 2, the adapter 13 comprises a locking/unlocking means, hereinafter called the locking means 20, which can move between a locking position in which the adapter 13 and the terminal portion 11 are unified with each other and an unlocking position in which the adapter 13 and the terminal portion 11 can be separated from each other. More particularly, in the locking position, a locking pin 20 which comprises the unlocking button 18 is engaged in a slot 11*a* of the terminal portion 11, particularly the upper wall of the terminal portion 11. In the unlocking position, the locking pin 20 is disengaged from the slot 11*a*, being situated outside of it.

Figure 2:
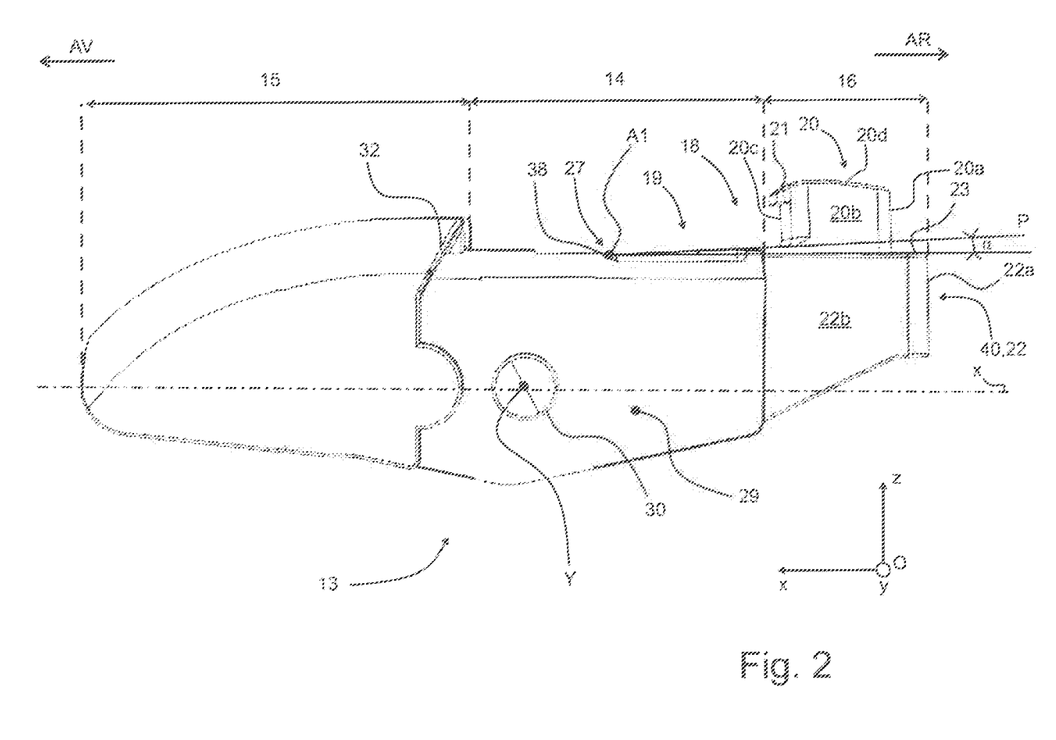
FIG. 2 is a side view of an adapter according to the present invention making up the windscreen wiping system illustrated in FIG. 1.
Figure 3:
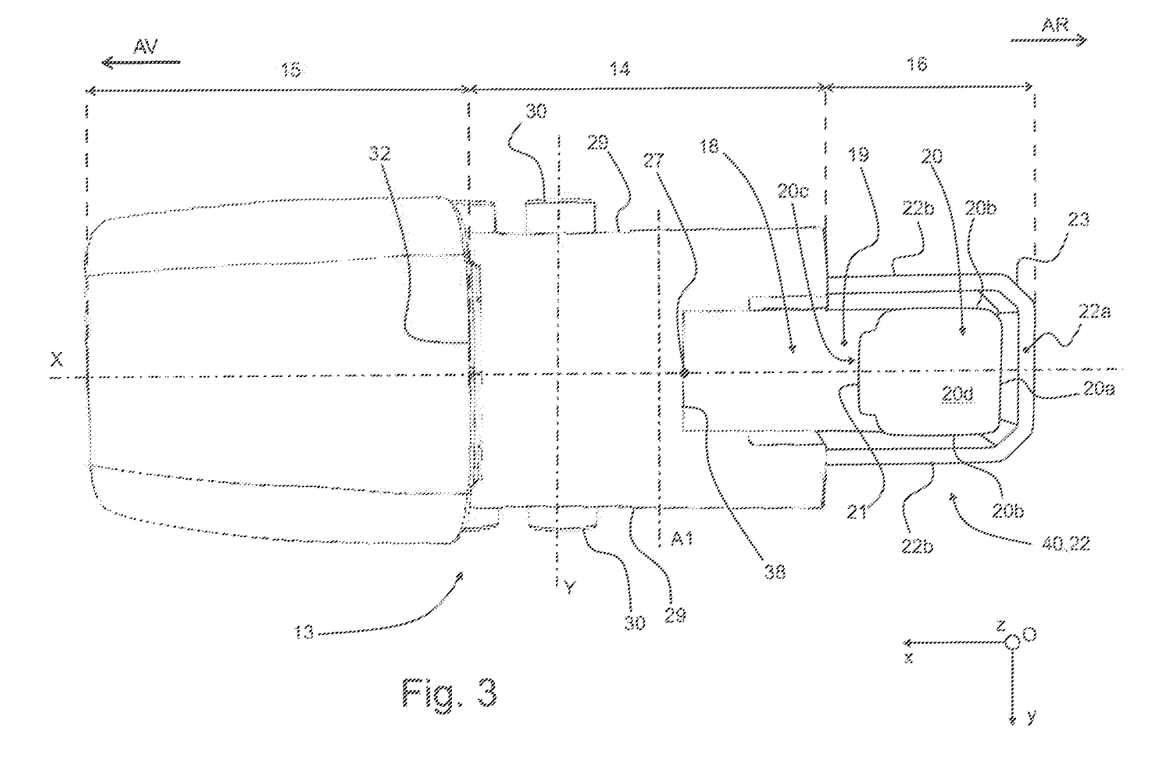
FIG. 3 is a top view of the adapter illustrated in FIG. 2.
Figure 4:
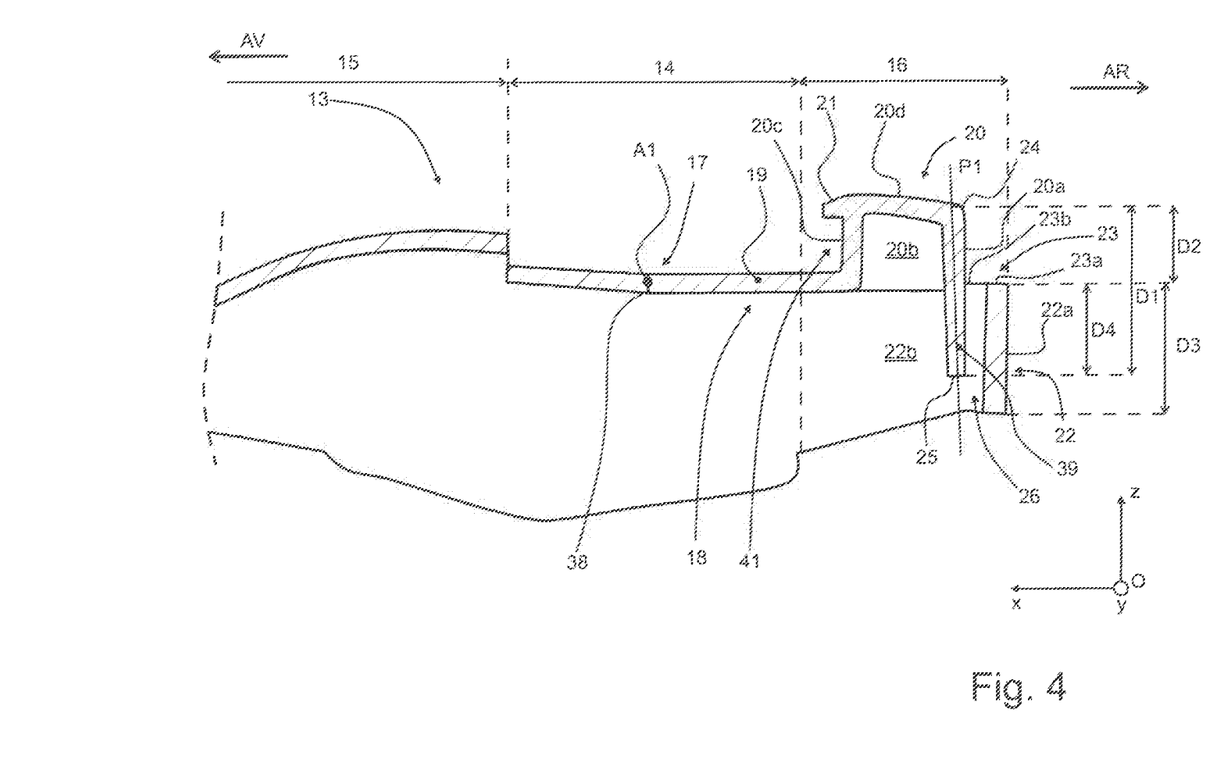
FIG. 4 is a partial view of a longitudinal section of the adapter illustrated in FIG. 2 or 3.

In FIGS. 2 to 4, the adapter 13 comprises an intermediate portion 14 which is interposed between a front portion 15 and a rear portion 16. In other words, from the front AV of the adapter 13 to the rear AR of the adapter 13 there are arranged in succession along the longitudinal axis X the front portion 15, then the intermediate portion 14, then the rear portion 16. In a cross section produced in a plane parallel to the plane Oyz, the adapter 13 has a U-shaped section, which is able to accommodate the connector.

The intermediate portion 14 is outfitted with a pivoting point 17 of the locking means 18, to enable a mobility of the locking means 18 between the locking position and the unlocking position in the plane Oxz. This pivoting point 17 comprises a hinge axis A1 parallel to the transverse axis Y, while the locking means 18 extends along the longitudinal axis X. The locking means 18 can thus move by pivoting in a plane parallel to the plane Oxz, orthogonal to the hinge axis A1. The pivoting point 17 forms the sole link between the locking means 18 and the intermediate portion 14.

The locking means 18 further comprises a plate 19, which is provided with the locking pin 20, in particular being positioned at a longitudinal end of the plate 19. The plate 19 is interposed longitudinally between the pivoting point 17 and the socking pin 20. In other words, the pivoting point 17 and the locking pin 20 are longitudinally opposite each other with respect to the plate 19.

The plate 19 extends for example inside a plane parallel to the plane Oxy. According to another embodiment illustrated in FIG. 2, the plate 19 extends along a plate plane P which makes an angle α with a plane parallel to the plane Oxy, the angle α being between 0° and 10°.

The pivoting of the locking means 20 is achieved by a pivoting means 27. The latter may have different forms, but two of these shall be presented below as an example. This pivoting means 27 may thus be obtained by at least two distinct or complementary means: by deformation of the plate 19, which then becomes a flexible tab, and/or by a hinge 38 situated in the area of the hinge axis A1 of the pivoting point 17.

The flexibility of the flexible tab is achieved by its structural material, or by its suitable conformation. As for the hinge 38, this is realized by the pliancy of the material composing the adapter 13. According to one variant, the hinge is formed for example by a thinning of material in a transverse plane parallel to the plane Oyz.

The locking pin 20 is longitudinally devised opposite the pivoting point 17 and it emerges above the plate 19. The locking pin 20 has a cross section, in a plane parallel to the plane Oxy, which is rectangular or square in particular. The locking pin 20 comprises a rear wall 20a, two side walls 20b and a front wall 20c. The rear wall 20a and the front wall 20c are for example parallel to each other and parallel to the plane Oyz. The side walls 20b, numbering two, are for example parallel to each other and parallel to the plane Oxz. The front wall 20c is the wall of the locking pin 20 which joins the latter to the plate 19. The rear wall 20a is the wall of the locking pin 20 which is furthest away from the pivoting point 17.

As is illustrated in FIG. 4, the rear wall 20a of the locking pin 20 extends in a first plane P1 between an upper end 24 and a lower end 25. The side walls 20b join together the rear wall 20a and the front wall 20c. The front wall 20c, the side walls 20b and the rear wall 20a are joined together by an upper wall 20d which forms a bearing surface for a user who wishes to unlock the locking means 18, and thereby disengage the locking pin 20 from the slot 11a.

According to the invention, the locking means 20 comprises an appendage 39. Such an appendage forms a means which participates in the function of preventing the kicking pin from leaving the slot 11. The appendage 39 emerges from the rear wall 20a of the locking pin 20 and extends in the plane P1 beyond the front wall 20c and side walls 20b. According to one exemplary embodiment, this appendage 39 takes the form of a small wall devised in the prolongation of the rear wall 20a of the locking pin 20.

The locking pin 20 comprises a transverse flange 21 which is parallel to the transverse axis Y and which extends above the plate 19. The transverse flange 21 emerges longitudinally from the front wall 20c of the locking pin 20. The transverse flange 21 is devised facing the pivoting point 17 and constitutes a protrusion of the locking pin 20 in the direction of this pivoting point 17. In other words, the transverse flange 21 forms a nose overhanging the plate 19. Put yet another way, the transverse flange 21 forms a protuberance of the locking pin 20 toward the front AV of the adapter 13.

FIGS. 2 to 4 also show that the rear portion 16 of the adapter 13 contains the locking pin 20 and a portion 40 which bounds off at least partially a volume 26 of the adapter 13. The portion 40 is any form of the adapter devised in the vicinity of the locking pin and with which the appendage 39 may interfere when the pivoting means 27 or the locking means 18 is broken.

According to one exemplary embodiment, the portion 40 takes the form of a peripheral belt 22. The peripheral belt 22 comprises a transverse wall 22a which is joined by two longitudinal walls 22b to the intermediate portion 14. The transverse wall 22a is preferably devised in a plane parallel to the plane Oyz. The longitudinal walls 22b are preferably devised in a plane parallel to the plane Oxz. In other words, the peripheral belt 22 has an overall U shape, whose base is formed by the transverse wall 22a and whose branches are formed by the longitudinal walls 22b. As a result, the peripheral belt 22 bounds off an area inside which the locking pin 20, the appendage 39 and at least partly the plate 19 are able to circulate during a pivoting movement of the locking means 18 about the hinge axis A1. In other words, the peripheral belt 22 bounds off the volume 26 which is bordered on three sides by the peripheral belt 22 and on the last side by the intermediate portion 14.

According to a first approach of the present invention, the lower end 25 of the appendage 39 of the locking pin 20 is disposed inside the volume 26. In other words, the appendage 39 carried by the locking pin 20 extends at least partially Inside the volume 26. Put yet another way, the internal volume 26 lodges the lower end 25 of the rear wall 20a, and a portion of the appendage 39.

According to a second approach of the present invention, the portion 40 comprises an upper flange 23 which is U-shaped in a cross section made in a plane parallel to the plane Oxy. The upper flange 23 comprises in particular a rear upper flange 23a and longitudinal upper flanges 23b which join the rear upper flange 23a to the intermediate portion 14. According to this approach of the invention, which can be seen in FIG. 4, a first distance D1 measured in the first plane P1 between the upper end 24 of the rear wall 20a and the lower end 25 of the appendage 39 is greater than a second distance D2 taken in the first plane P1 between the upper end 24 of the rear wall 20a and an orthogonal projection of the rear upper flange 23a in the first plane P1 taken parallel to the plane Oyx.

FIG. 4 also shows that the portion 40 extends for a height D3, whereas a height D4 of the appendage 39 measured in the plane P1 is less than the distance D3. It will be understood here that the appendage 39 is entirely contained in the height of the portion 40. Alternatively, the height D4 could be greater than the height D3, the lower end 25 being then situated outside of the volume 26.

Figure 5:
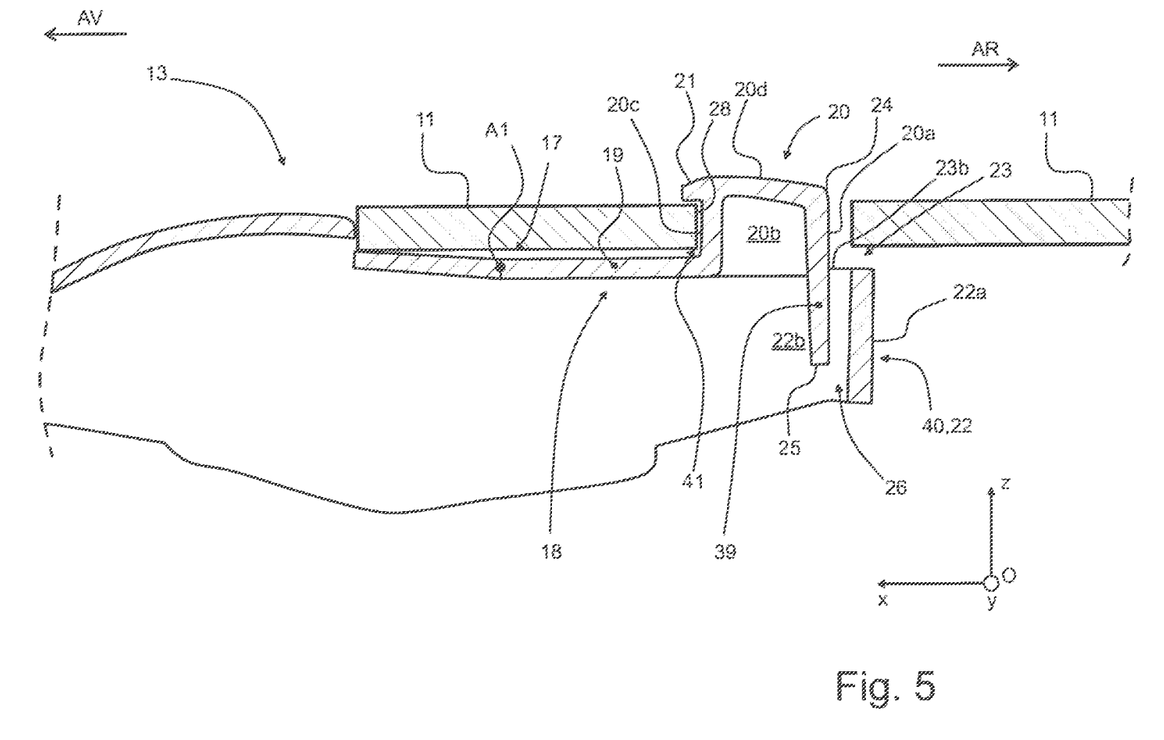
FIG. 5 is a partial view of a longitudinal section of the adapter illustrated in FIGS. 2 to 4 outfitted with a terminal portion of a drive arm.

According to the provisions of the present invention, in event of a breakage of the locking means 18, and especially of the plate 19 of the locking means 18, or of the hinge 38, the appendage 39 and especially its lower end 25 comes up against the portion 40, for example, against the transverse wall 22a of the peripheral belt 22. In other words, during such a breakage, the locking means 18 moves from a first position illustrated in FIG. 5 to a second position illustrated in FIG. 6.

Figure 6:
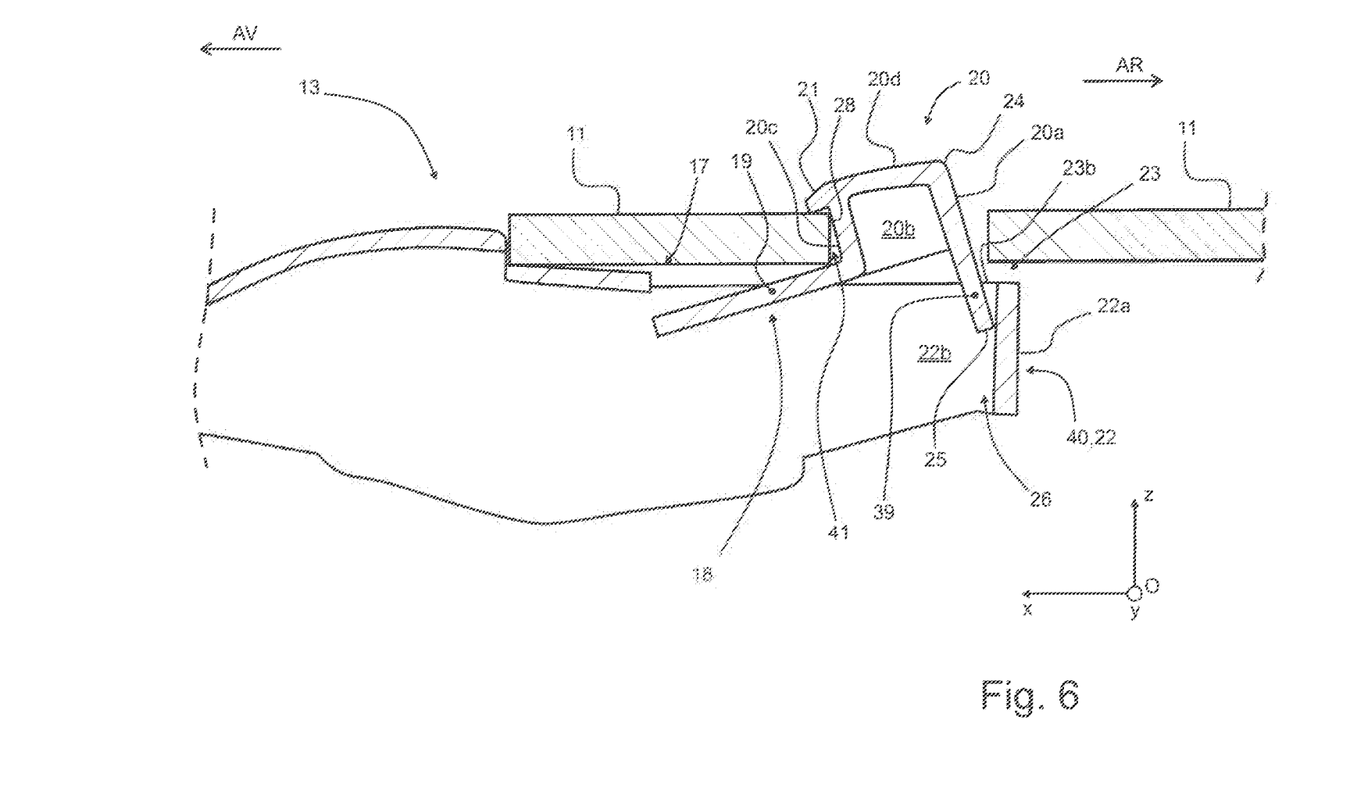
FIG. 6 is a partial view of a longitudinal section of the adapter and the terminal portion illustrated in FIG. 5 after breaking of a zone of the adapter.

As is represented in FIG. 6, in event of breakage of the plate 19 and/or the hinge 38, the transverse wall 22a forms a means of holding the appendage 39 to prevent a longitudinal escaping of the locking pin 20 from the slot 11a of the terminal portion 11 of the drive arm. As a final result, including the case of breakage of the plate 19 and/or the hinge 38, the adapter 13 remains coupled to the terminal portion 11. The end result is a mechanical holding of the wiper blade 1 on the drive arm 2, which prevents any projection of the wiper blade 1 when the windscreen wiping system 3 is used with the adapter 13 damaged.

It will also be noted in FIG. 6 that the transverse flange 21 and the plate 19 bound off a zone 41 in which a front border 28 extends and bounds off the slot 11a. Such an arrangement strengthens the blocking of the locking pin 20 inside the slot 11a any prevents any untimely uncoupling of the adapter 13 from the terminal portion 11. The locking pin 20 is thus braced between an abutment of the transverse flange 21 against an upper face of the terminal portion 11 and an abutment of the appendage 39, especially its lower end 25, against an internal face of the portion 40.

Figure 7:
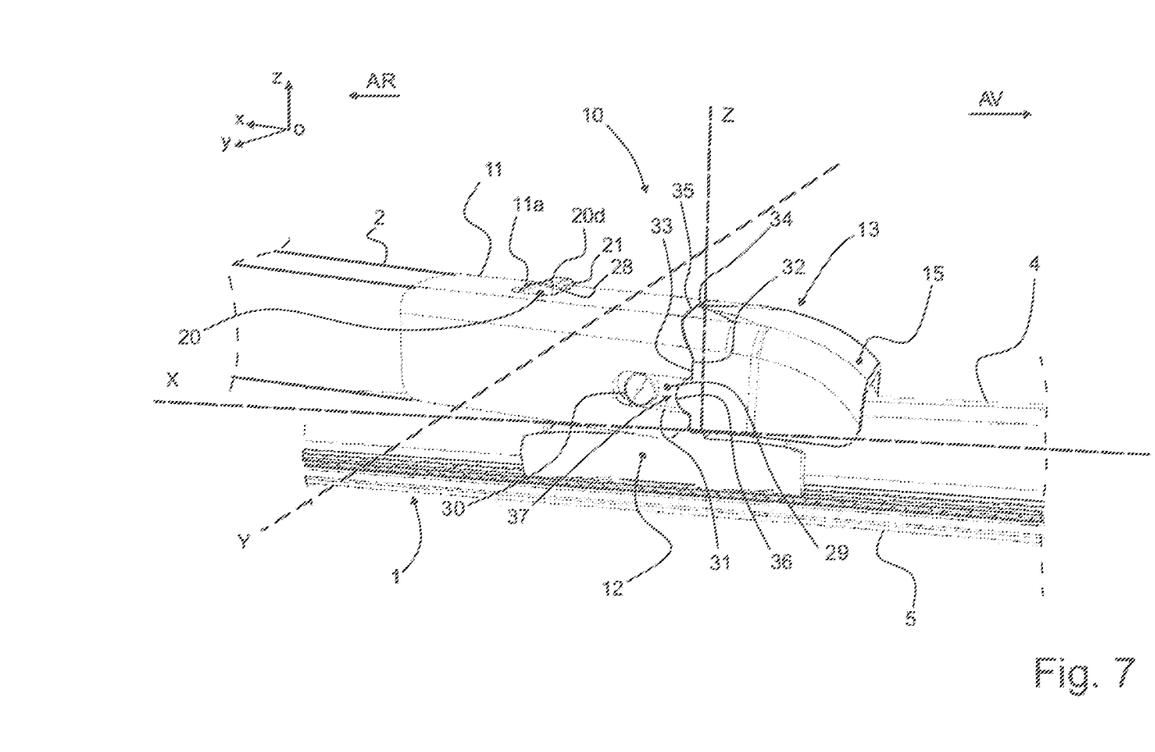
FIG. 7 is a partial perspective view of the windscreen wiping system illustrated in FIG. 1.

In FIG. 7, the connector 12 is able to carry the wiper blade 1 and it is mounted in rotation on the adapter 13. According to one embodiment of the invention, the adapter 13 and the connector 12 are made by moulding of a synthetic material, such as a material from the family of the polyoxymethylenes, known by the acronym POM, or by moulding of a mixture of polymer materials, such as a mixture of polymers of the family of the polycarbonates and the family of the acrylonitrile butadiene styrenes, known by the acronym ABS. Such an embodiment facilitates the implementation of the hinge 38 in particular.

The adapter 13 on the one hand and the connector 12 on the other hand are preferably each in one piece. In other words, the adapter 13 on the one hand and the connector 12 on the other hand are monobloc and cannot be broken down into several pieces except by destruction of the adapter 13 or the connector 12. As for the terminal portion 11, this is made for example by bending a metal sheet, such as a sheet of steel, aluminium, or the like, or by moulding of a synthetic material.

The front portion 15 of the adapter 13 is profiled toward the front AV of the adapter 13, such that the front portion 15 forms a nose which prolongs longitudinally the terminal portion 11, so as to profile the latter. In a cross section taken in a plane parallel to the plane Oyz, the front portion 15 has a U-shaped cross section.

Referring also to FIGS. 2 and 3, and in a cross section taken in a plane parallel to the plane Oyz, the intermediate portion 14 also has a U-shaped cross section. The intermediate portion 14 of the adapter 13 also comprises two side walls 29 extending in a plane parallel to the plane Oxz and each provided with a finger 30 emerging from the side wall 29 having the finger 30. Preferably, the finger 30 is shaped as a cylindrical portion with an axis of revolution parallel to the transverse axis Y.

As can be seen in FIG. 7, the finger 30 is provided to slide inside a groove 31 comprised by the terminal portion 11 of the drive arm 2. The diameter of the finger 30 is preferably less than a width of the groove 31 taken along the vertical axis Z, to enable an easy sliding of the finger 30 in the groove 31.

Referring once more to FIGS. 2 and 3, the front portion 15 comprises a shoulder 32 which emerges above the side walls 29 of the intermediate portion 14. In other words, the front portion 15 is wider than the intermediate portion 14 of the adapter 13. This difference in width is equal, for example, to twice the thickness of the wall making up the terminal portion 11 of the drive arm 2. The shoulder 32 forms an end stop for a front edge 33 of the terminal portion 11 of the drive arm 2. The shoulder 32 is provided with a protrusion 34 which is in particular an appendage of the front portion 15 toward the intermediate portion 14 of the adapter 13. The protrusion 34 is meant to abut inside a recess 35 of the terminal portion 11, the recess 35 being devised toward the rear AR of the terminal portion 11.

The shoulder 32 comprises at least one interlocking member 36 which is complementary in shape to an entrance of the groove 31 of the terminal portion 11 of the drive arm 2. The interlocking member 36 and the groove 31 cooperate with each other to facilitate a contacting and an abutment of the shoulder 32 with the front edge 33.

According to the embodiment illustrated, the interlocking members 36 are two in number and they prolong the front portion 15, overlapping on the intermediate portion 14. The interlocking member 36 thus emerges from the shoulder 32 and extends to the rear AR of the adapter 13, being carried by the side wall 29 of the intermediate portion 14. Alternatively, the interlocking member 36 may be singular on the adapter 13.

Each interlocking member 36 is for example shaped as a semicircular bulge to cooperate with an outlet 37 of the groove 31. The interlocking member 36 and the outlet 37 of the groove 31 together prevent a vertical displacement of the adapter 13 with respect to the terminal portion 11 of the drive arm 2, in the position of use of the adapter 13. The interlocking member or members 36 are advantageously means of vertical blocking of the adapter 13 in the terminal portion 11 of the drive arm 2.

All of these provisions are such that, in event of a breaking of the locking means 18 and/or the pivoting means 27, the locking pin 20 remains inside the slot 11a of the terminal portion and consequently the adapter 13 remains fixed to the drive arm, without being able to become uncoupled longitudinally, transversely or vertically.

The invention claimed is:

1. An adapter configured to connect a wiper blade to a drive arm of a windscreen wiping system for vehicles,
the adapter being outfitted with at least one locking means comprising a plate at the end of which is arranged a locking pin that fits into a slot of a terminal portion of the drive arm,
the adapter comprising:
a pivoting means of the locking means;
a U-shaped portion having a transverse component and two longitudinal components each with upper edges that collectively define a plane, said U-shaped portion at least partially bounding off a volume of the adapter, the transverse component having a planar inner surface extending continuously from its upper edge to a bottom terminal edge; and
an intermediate portion interposed between a front portion and a rear portion along a longitudinal axis of the adapter, the rear portion comprising the locking pin and the U-shaped portion,
the locking pin comprising:
a front wall, a rear wall and two side walls joining the front wall to the rear wall, an appendage which prolongs the rear wall and which extends into the inside of the volume of the adapter by crossing over the plane defined by the U-shaped portion, and a transverse flange which emerges from the front wall to engage an upper surface of the terminal portion of the drive arm, wherein the appendage and the plate circulate during a pivoting movement of the locking means about the pivoting means, and wherein the transverse component holds the appendage to prevent a longitudinal escaping of the locking pin from the slot of the terminal portion of the drive arm in event of breaking of the locking means or the pivoting means.

2. The adapter according to claim 1, wherein the plate and the transverse flange bound off a zone that receives an edge bounding the slot.

3. The adapter according to claim 1, wherein the volume extends along a height, the appendage being integrally contained inside the volume.

4. The adapter according to claim 1, wherein the U-shaped portion is a peripheral belt surrounding the locking means.

5. The adapter according to claim 4, wherein the peripheral belt comprises a transverse wall, for the transverse component, supported by two longitudinal walls, for the longitudinal components, which bound off the volume, the longitudinal walls emerging from the intermediate portion.

6. The adapter according to claim 5, wherein the transverse wall forms an abutment for the appendage in event of breaking of the locking means or the pivoting means.

7. A connection device formed by a connector and the adapter according to claim 1.

8. A wiper blade comprising:
at least one scraper blade;
a flexible support which holds the scraper blade along a length of the scraper blade; and
at least one adapter according to claim 1.

9. The adapter according to claim 1, wherein an interlocking member is provided on a shoulder of the front portion, such interlocking member is complementary in shape to an entrance of a groove of the terminal portion of the drive arm.

* * * * *